(12) United States Patent
Iwazawa (10) Patent No.: US 7,253,573 B2
(45) Date of Patent: Aug. 7, 2007

(54) POWER SOURCE FOR A HYBRID VEHICLE

(75) Inventor: Masahide Iwazawa, Nishikasugai-gun (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 11/403,879

(22) Filed: Apr. 14, 2006

(65) Prior Publication Data

US 2006/0232235 A1   Oct. 19, 2006

(30) Foreign Application Priority Data

Apr. 15, 2005 (JP) .............................. 2005-118106

(51) Int. Cl.
*H02P 7/00* (2006.01)

(52) U.S. Cl. ...................... 318/139; 318/500; 318/432; 320/104; 320/118

(58) Field of Classification Search ................ 318/139, 318/459, 500, 432; 320/104, 118
See application file for complete search history.

(56) References Cited

U.S. PATENT DOCUMENTS

| | | | |
|---|---|---|---|
| 5,508,594 A | * | 4/1996 | Underwood et al. ........ 318/139 |
| 6,870,336 B2 | * | 3/2005 | Murakami et al. .......... 318/432 |
| 6,909,201 B2 | * | 6/2005 | Murty et al. ................ 307/10.1 |
| 6,979,977 B2 | * | 12/2005 | Amano et al. .............. 320/104 |
| 2004/0232881 A1 | * | 11/2004 | Amano et al. .............. 320/104 |
| 2005/0151517 A1 | * | 7/2005 | Cook et al. .................. 323/207 |
| 2006/0097577 A1 | * | 5/2006 | Kato et al. .................. 307/10.1 |

FOREIGN PATENT DOCUMENTS

JP   2002-321631   11/2002

* cited by examiner

*Primary Examiner*—Rina Duda
(74) *Attorney, Agent, or Firm*—Oblon, Spivak, McClelland, Maier & Neustadt, P.C.

(57) ABSTRACT

A power source for a hybrid vehicle is provided which can protect its electric motor driving circuit from being damaged by a back electromotive force generated in a motor. The back electromotive force generated in an electric motor is detected by a high voltage detector circuit and converted by a step-down circuit into a low voltage which is then stored in a low-voltage second battery. Accordingly, as the back electromotive force does not become excessively high, it will be prevented from damaging a switching circuit. Also, the back electromotive force generated in the motor is charged in the low-voltage battery and can thus be supplied to a control circuit or any other component, contributing to the reduction of the fuel consumption of the hybrid vehicle. The back electromotive force can alternatively be diverted for charging a medium-voltage third battery.

6 Claims, 7 Drawing Sheets

POWER SOURCE FOR A HYBRID VEHICLE

CROSS-REFERENCE TO RELATED APPLICATION

The present application claims priority under 35 U.S.C. §119 to Japanese Patent Application No. JP2005-118106. The content of the application is incorporated herein by reference.

FIELD OF THE INVENTION

The present invention relates to a power source for a hybrid vehicle which comprises an engine and a motor generator and employs three different levels of voltage: a high voltage for driving the motor generator, a medium voltage for driving motors such as an electric power steering device and the like, and a low voltage for driving controllers.

BACKGROUND OF THE INVENTION

A hybrid vehicle equipped with an engine and a motor generator commonly employs a high potential of a few hundreds volts for contributing to the size reduction and the high efficiency of the motor generator as well as a low voltage of 14 V (or 12 V) for power supply to electric components which are used in an existing combustion engine vehicle. Consequently, a high voltage battery for providing a high voltage of a few hundreds volts is provided in addition to a common 14-V (12-V ) low-voltage battery. Also, a medium voltage of 42 V is sometimes utilized for motors consuming a large amount of power, such as an electric power steering motor and an air conditioning compressor motor. In general, a medium voltage of 42 V is generated as a result of stepping down a high potential by a DC/DC converter and no specific medium voltage battery, is provided.

Disclosed in Prior Art is an invention for responding to the back electromotive force of an electric motor in an electrical power steering device.

Prior Art: JP 2002-321631 A is incorporated herein by reference.

SUMMARY OF THE INVENTION (Problem that the Invention is to Solve)

However, when a vehicle runs over an edge stone or on a rough road or is steered at high speeds during running on a low μ road, its electric motor for steering assist produces a back electromotive force. Hence, it is necessary to select switching elements of a needlessly higher reverse voltage in the switching circuit for supplying the motor with a power. As a result thereof, so that a failure may not occur due to a back electromotive force, this is not cost efficient. The back electromotive force is dissipated by the action of a resistor circuit in the ECU. If the back electromotive force is generated continuously during the run on a rough road and the like, heat is not released sufficiently, such that ECU itself may be affected by heat.

The present invention is made for overcoming the above described drawback and its object is to provide a power source for a hybrid vehicle which can prevent its electric motor driving circuit from being damaged by the generation of a back electromotive force.

(Means for Solving the Problem)

To achieve the above object, a power source 20 for a hybrid vehicle, according to a first aspect of the present invention, having an engine 11 and an motor generator 12 and using a high voltage (280 V) for driving the motor generator 12, a medium voltage (42 V) for driving a motor 44 of an auxiliary device, and a low voltage (14 V) for a controller, and including a first battery 24 for a high voltage (280 V) and a second battery 28 for a low voltage(14 V). The power source 20 comprises a step-down circuit 46 for stepping down the medium voltage (42 V) to the low voltage (14 V) and a back electromotive force detecting means (a high voltage detector circuit 48) for detecting generation of a back electromotive force in the motor 44 of an auxiliary device and charging the low voltage stepped down by the step-down circuit 46 in the secondary battery 28 for the low voltage (14 V).

According to a second aspect of the present invention, a power source 20 for a hybrid vehicle having an engine 11 and a motor generator 12 and using a high voltage (280 V) for driving the motor generator 12, a medium voltage (42 V) for driving a motor 44 of an auxiliary device, and a low voltage (14 V) for a controller, the power source including a first battery 24 for the high voltage (280 V) and a second battery 28 for the low voltage (14 V), the power source for a hybrid vehicle 20 comprising; a third battery 45 for the medium voltage (42 V) and back electromotive force detecting means (a high voltage detector circuit 48) for detecting generation of a back electromotive force in the motor 44 of an auxiliary device and for charging the back electromotive force In the third battery 45 for the medium voltage.

According to a third aspect of the present invention, a power source for a hybrid vehicle 20 having an engine 11 and a motor generator 12 and using a high voltage (280 V) for driving the motor generator 12, a medium voltage (42 V) for driving a motor 44 of an auxiliary device, and a low voltage (14 V) for a controller, and including a first battery 24 for the high voltage (280 V) and a second battery 28 for the low voltage (14 V), the power source for a hybrid vehicle 20 comprising; a third battery 45 for the medium voltage (42 V) arranged for temporarily maintaining the power of a back electromotive force generated in the motor 44 of an auxiliary device and supplying an electricity to the motor 44 of an auxiliary device.

(Effect of the Invention)

According to the first aspect of the present invention, the back electromotive force detecting means (a high voltage detector circuit 48) detects the back electromotive force generated in the motor 44 of an auxiliary device and coverts the back electromotive force stepped down in a step-down circuit 46 and the low voltage is charged in the second battery 28 for the low voltage (14 V). Accordingly, as the back electromotive force is prevented from being excessively high, the failure of the motor driving circuit 42 due to the back electromotive force can be prevented. Also, the back electromotive force generated in the motor 44 is charged in the second battery 28 for the low voltage (14V), to make efficient use of energy, contributing to the reduction of the fuel consumption of the hybrid vehicle.

According to the second aspect of the present invention, the back electromotive force detecting means (a high voltage detector circuit 48) detects the back electromotive force generated in the motor 44 of an auxiliary device and charges it in the third battery 45 for the medium voltage. Accordingly, as the back electromotive force is prevented from being excessively high, a failure of the electric motor driving circuit 42 due to the back electromotive force can be prevented.

According to the third aspect of the present invention, when the back electromotive force generated in the motor 44 of an auxiliary device, it is charged in the third battery 45 for the medium voltage. Accordingly, as the back electromotive force does not become excessively high, the electric motor driving circuit 42 is prevented from being damaged by the back electromotive force. Also, the back electromotive force generated in the motor 44 is changed in the third battery 45 for the medium voltage and can again be supplied to the motor 44, contributing to the reduction of the fuel consumption of the hybrid vehicle.

BEST MODES FOR EMBODYING THE INVENTION

First Embodiment

A hybrid vehicle using a power source according to the first embodiment of the present invention will be described with reference to FIGS. 1 to 4.

Figure 1:
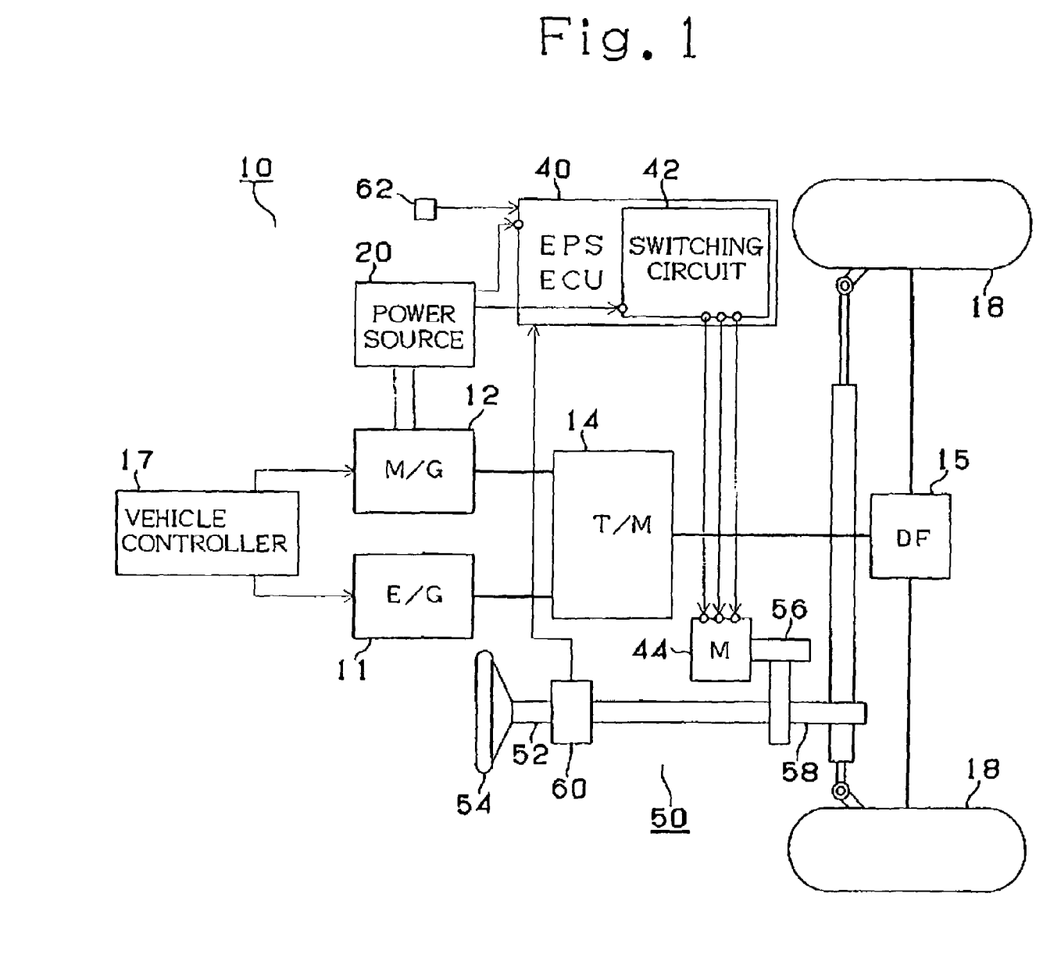
FIG. 1 is a schematic view of a construction of a hybrid vehicle using a power source according to the first embodiment of the present Invention.

FIG. 1 is a schematic view of a hybrid vehicle 10. The hybrid vehicle 10 (referred simply to as a vehicle 10 hereinafter) according to the first embodiment has a power system, in which an engine 11 and a motor generator 12 are used as a driving source. The power system comprises the engine 11, the motor generator 12, a power source 20, a transmission 14, a differential gear 15, and drive wheels 18 and 18. More specifically, output shafts of the engine 11 and the motor generator 12 are connected to the transmission 14, which is connected via the differential gear 15 to axle of the drive wheels 18 and 18. With this configuration, the driving force outputted from the engine 11 and/or the motor generator 12 can be transmitted to the drive wheels 18 and 18. In FIG. 1, the engine 11, the motor generator 12, the transmission 14, and the differential gear 15 are denoted, in turn, by E/G, M/G, T/M, and DF, respectively.

The engine 11 is a gasoline combustion engine of a reciprocating type or is simply referred to as a combustion engine. The motor generator 12 may be an alternating current motor, which functions as both an electric motor and an electric generator. Therefore, the motor generator 12 functions as an electric generator upon receiving a rotating force of the drive wheels 18 and 18 via the differential gear 15 and the transmission 14 during a braking action.

The power source 20 includes a chargeable and dischargeable first battery of a high voltage (e.g. 280 V) and is electrically connected with the motor generator 12. Accordingly, the motor generator 12 is supplied with a power discharged from the power source 20 if the motor generator 12 serves as a motor, while the motor generator 12 supplies a power to the power source 20, which is charged with a power if the motor generator 12 serves as a generator.

The transmission 14 includes a group of planetary gears or the like, not shown. For example, a carrier shaft of the planetary gear is connected to the engine 11, and a sun gear shaft to the motor generator 12, and a ring gear shaft to the differential gear 15 as a driving shaft. The differential gear 15 transmits a driving force inputted from the transmission 14 to the left and right axles. Mounted to the left and right axles are the drive wheels 18 and 18.

With the construction of the driving system of the vehicle 10, an engine torque outputted from the engine 11 can be distributed to the differential gear 15 and the motor generator 12. Accordingly, as the motor generator 12 is set to a driven mode, the engine torque is transmitted to the differential gear 15 to drive the vehicle 10 and simultaneously a part of the engine torque is transferred to drive the motor generator 12. As a result thereof, even if the vehicle 10 is driven by the driving force of the engine 11, the motor generator 12 can generate electricity.

Also, when the power source 20 supplies a power to the motor generator 12 to drive the motor generator 12 as a generator, a combined torque of an engine 11 and a motor torque of the motor generator 12 can be transmitted to the differential gear 15. This allows the vehicle 10 to run with a greater level of the torque than the engine torque outputted from the engine 11 alone. During the acceleration, the vehicle 10 can be driven at a hybrid driving mode utilizing a combination of the engine 11 and the motor generator 12 such that the vehicle 10 can obtain an acceleration performance exceeding that of the engine 11.

When the engine 11 is stopped to lock the carrier shaft of the transmission 14, the motor generator 12 can be turned to a motor driving mode in which the vehicle 10 is driven by only the driving force of the motor generator 12. For the engine drive during the start and the low speed running and the like, a motor driving mode at an area of a low combustion efficiency can be changed, thereby increasing an efficiency of energy consumption of the vehicle 10. In addition, during deceleration, the engine 11 is disconnected from the transmission gear 14 and the motor generator 12 is driven by a rotating force of the drive wheels 18 and 18 inputted via the differential gear 15 to the transmission 14, so that the motor generator 12 can generate an electric energy to convert an energy corresponding to a decelerating amount to an electric energy. Thus, the power outputted from the motor generator 12 serving as the electric generator can effectively be charged in the power source 20.

The hybrid vehicle 10 also includes an electric power steering system 50. The electric power steering system 50 comprises a torque sensor 60 for detecting a steering torque, a control device 40 for calculating a motor commanding torque (steering assist amount) from a steering torque determined by a torque sensor 60 and a vehicle speed detected by a vehicle speed sensor 62, and a switching circuit 42 for obtaining a current command value corresponding the motor command torque and controlling a current to a motor 44.

The torque sensor 60 is mounted on a steering shaft 52 connected to the steering wheel 54 of the vehicle. The output of the motor 44 is decelerated by a speed reducing gear 56 and transmitted to a rack-pinion gear 58 for steering the drive wheels 18 and 18.

The power source 20 supplies the motor generator 12 with a high voltage of 280 V, the control device 40 with a low voltage of 14 V, and the switching circuit 42 with a medium voltage of 42 V. The drawings show that a low voltage of 14 V is supplied to the control device 40 and a medium voltage of 42 V is supplied to the switching circuit 42. However, these voltages are adapted to be supplied to other various apparatuses in the drawings.

Figure 2:
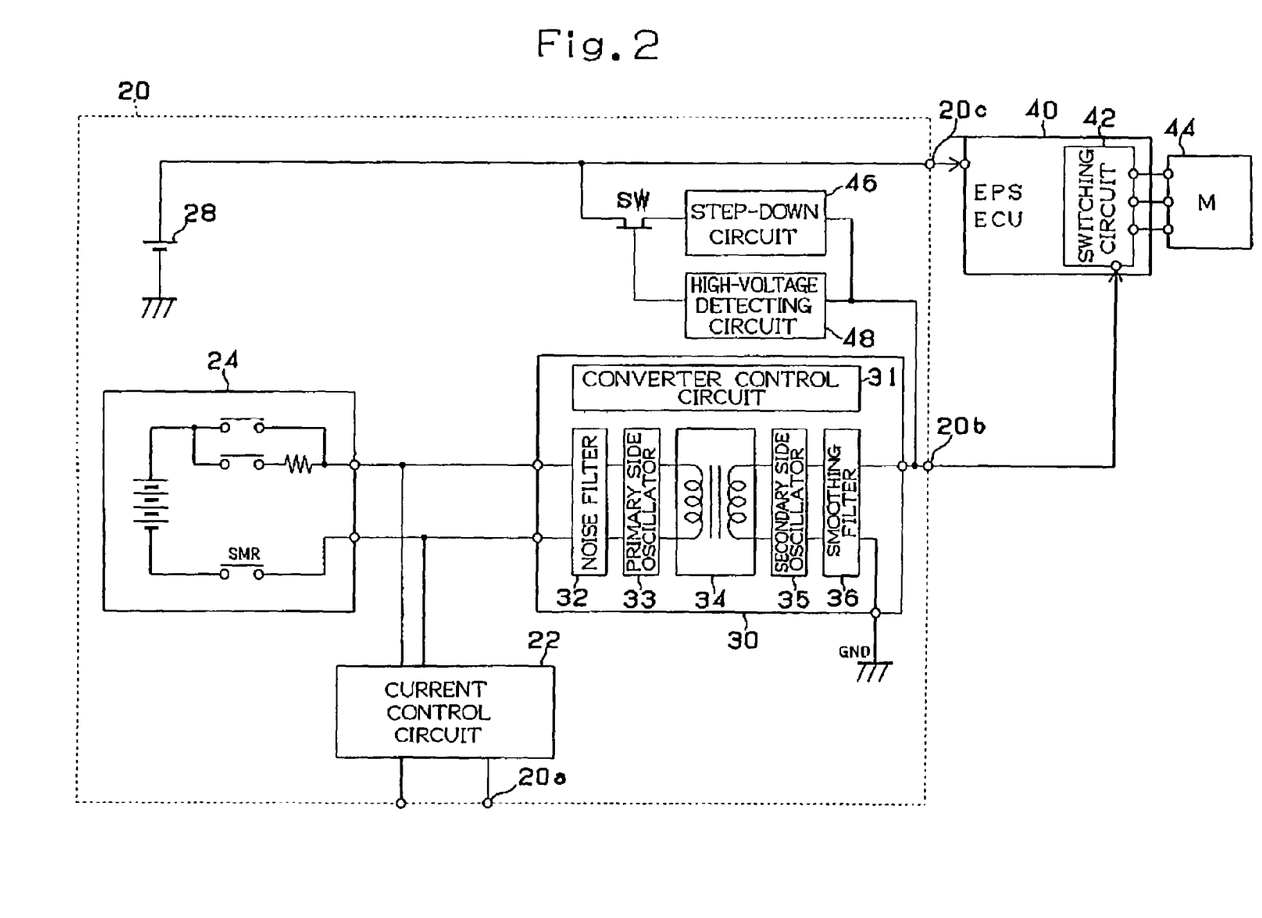
FIG. 2 is a block diagram of the power source according to the first embodiment.

A structure of the power source 20 will now be described with reference to FIG. 2. The power source 20 includes a high voltage output port 20a of 280 V, a medium voltage output port 20b of 42 V, a low voltage output port 20c of 14 V, a high-voltage first battery 24 of 280 V, and a low-voltage second battery 28 of 14 V. Also, a current control circuit 22 is connected between a high-voltage first battery 24 and the motor generator 12 shown in FIG. 1 for controlling a charging and a discharging action of the high-voltage first battery 24. A DC/DC converter 30 is provided between the high-voltage first battery 24 and the medium voltage output port 20b for converting 280 V into 42 V. The DC/DC converter 30 comprises a converter control circuit 31, a noise filter 32, a primary side oscillator 33 for converting a direct current into a pulsed current, a transformer 34, a secondary side oscillator 35 for converting a pulsed current into a direct current, and a smoothing filter 36.

A high-voltage detector circuit 48 for detecting the generation of a back electromotive force in the motor 44 and a step-down circuit 46 for stepping down the back electromotive force to 14 V are connected between the output of the DC/DC converter 30 and the low-voltage second battery 28. An output of switch SW to the low-voltage second battery 28.

Figure 3:
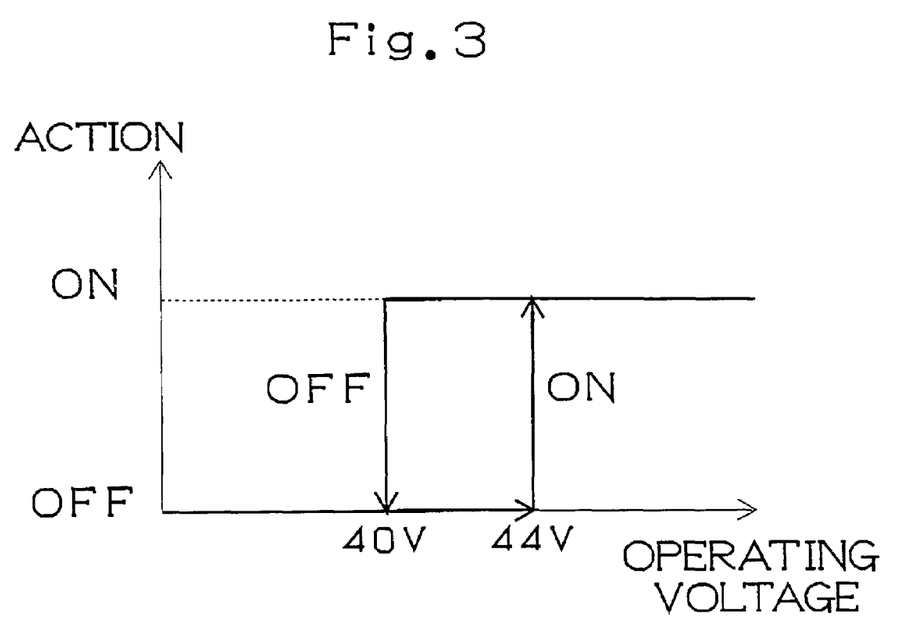
FIG. 3 is an explanatory view illustrating the action of a high-voltage detecting circuit.

An action of a high-voltage detector circuit 48 will be described with reference to FIGS. 3 and 4. FIG. 3 is an explanatory view illustrating the action of the high-voltage detector circuit 48, in which a horizontal axis represents an action potential while a vertical axis represents a switching action. The high-voltage detector circuit 48 has a hysteresis for stabilizing the switching action. When the potential of 42 V to be supplied to the switching circuit exceeds 44 V due to a back electromotive force in the motor 44, the switch SW is turned on to charge the low-voltage second battery 28 with a current stepped down to 14 V by the step-down circuit 46. Alternatively, when the potential of 42 V to be supplied to the switching circuit becomes lower than 40 V, the switch SW is turned off to stop charging to the low-voltage second battery 28.

Figure 4:
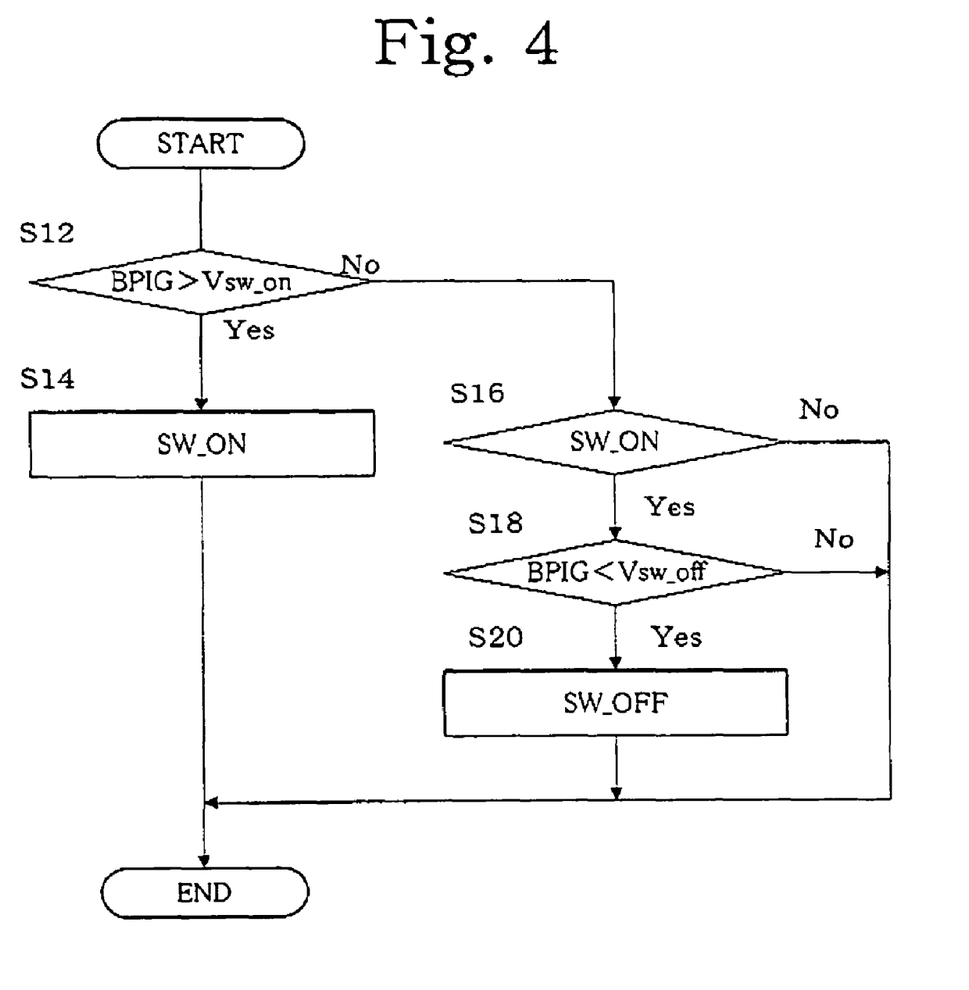
FIG. 4 is a flowchart showing steps of the action of the high-voltage detecting circuit.

FIG. 4 is a flowchart showing a processing of the high-voltage detector circuit 48. It is first judged whether or not the potential (BPIG) of 42 V to be supplied to the switching circuit exceeds 44 V (Vsw_on) for turning the switch SW on (S12). When the potential remains at 42 V, the potential is not higher than 44 V (No at S12). Thus, the judgment at the step S16 is made as "No" and the processing ends.

When the potential to be supplied to the switching circuit exceeds 44 V due to the back electromotive force, the judgment at the step S12 is made as "Yes" and the switch SW is turned on (S14). When the back electromotive force is declined to below 44 V, the judgment at the step S12 is made as "No" and the processing passes through the step S16 (Yes) and advances to the step S18 where it is judged whether or not the potential to be supplied to the switching circuit is lower than 40V (Vsw_off) for turning the switch SW off. Until the potential becomes not lower than 40 V (No at S18), the processing ends. When the potential becomes lower than 40 V (Yes at S18), the switch SW is turned off (S20). In-this-embodiment, the high-voltage detector circuit 48 is provided in the power source 20. However, the processing in the high-voltage detector circuit 48 can be executed according to a program Installed In the control device 40 of the power steering system.

In the first embodiment, the back electromotive force generated in the motor 44 is detected, stepped down reduced by the step-down circuit 46 and then stored in the low-voltage second battery 28. Accordingly, as the back electromotive force does not become excessively high, the failure of the switching circuit 42 by the electromotive force can be presented. Even if, in the embodiment, semiconductor devices which are low in the cost and the inverse resistance is employed, a failure does not occur, thereby contributing to the reduction of the manufacturing cost of the switching circuit. Moreover, since the back electromotive force generated in the motor 44 is charged in the low-voltage second battery 28 before distributed to the control device 40, the fuel consumption amount of the hybrid vehicle can be reduced.

Second Embodiment

Figure 5:
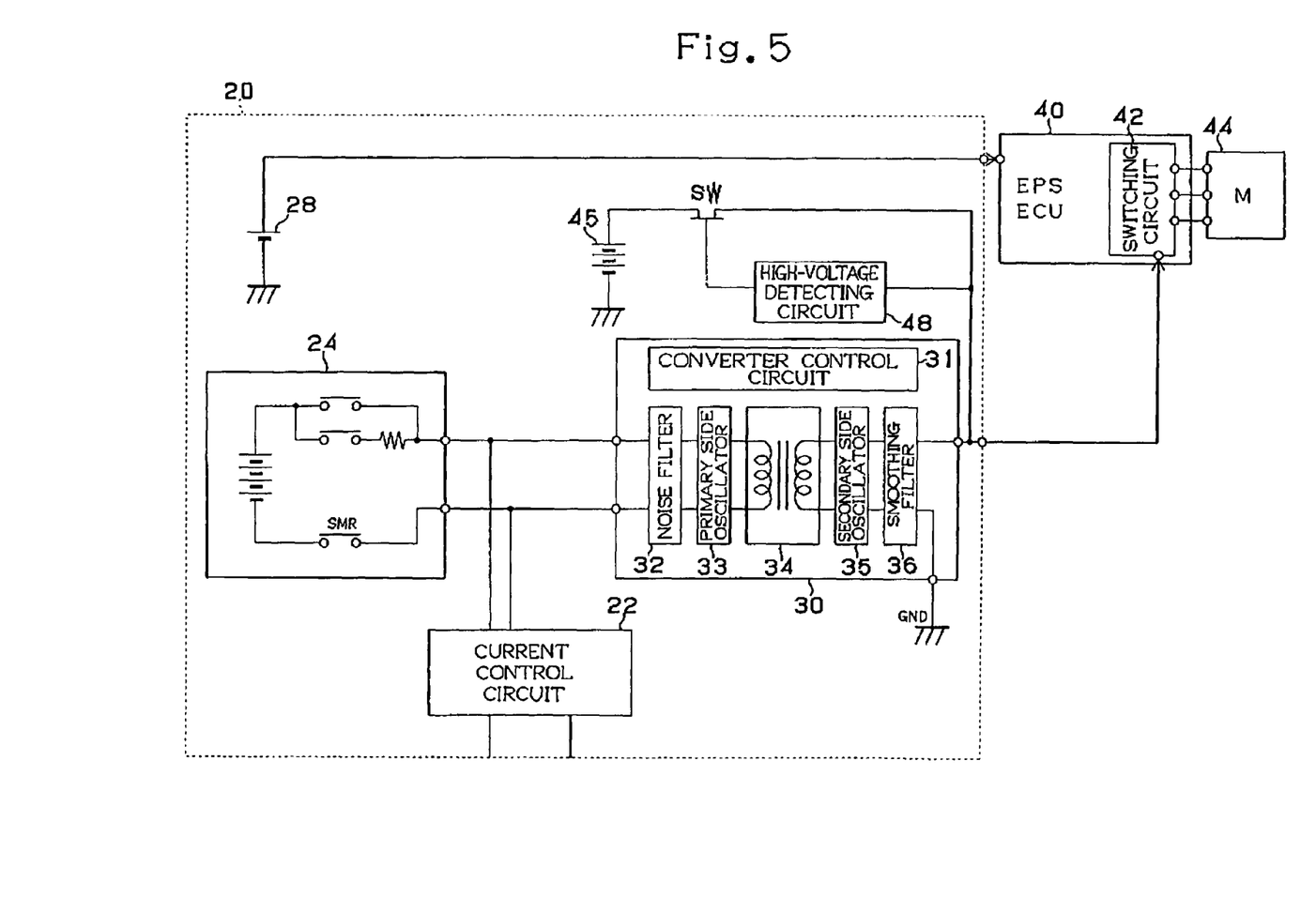
FIG. 5 is a block diagram of a power source according to the second embodiment of the present invention.

FIG. 5 illustrates a construction of a power source 20 according to the second embodiment of the present invention. The second embodiment is equal in the arrangement of a hybrid vehicle to the first embodiment shown in FIG. 1, excluding the power source 20, and its like components will be not explained in detail.

The second embodiment includes a medium-voltage third battery 45 of 42 V. Similar to that of the first embodiment, the high-voltage detector circuit 48 has a hysteresis for stabilizing the switching action. When the potential of 42 V to be supplied to the switching circuit exceeds 44 V due to the generation of a back electromotive force of the motor 44, a high-voltage detector circuit 48 turns the switch SW on to start charging a medium-voltage third battery 45. When the potential to be supplied to the switching circuit is lower than 42 V, the circuit 48 turns the switch SW off to stop charging.

In the second embodiment, the back electromotive force generated in the motor 44 can be detected and be charged in the medium-voltage third battery 45. Accordingly, as the back electromotive force does not become excessively high, the failure of the switching circuit 42 by the back electromotive force can be avoided. Even if, in the embodiment, semiconductor devices which are low in the cost and the inverse resistance is employed, the failure does not occur, thereby contributing to the reduction of the manufacturing cost of the switching circuit.

The back electromotive force may be consumed by providing the control device 40 with a resistor circuit. However, for example, when the back electromotive force is generated constantly during running on a rough road, the radiation of heat can not be carried out in the resistor circuit, such that the control device is exposed to heat effect. In the second embodiment, such a drawback of heat effect can be avoided.

In the second embodiment, a power charged in the medium-voltage third battery 45 is utilized and a medium-voltage third battery of a small capacity is used when the back electromotive force is generated at less frequencies. This simple construction is advantageous in that the overall weight of the power source can be decreased.

First Modification of the Second Embodiment

Figure 6:
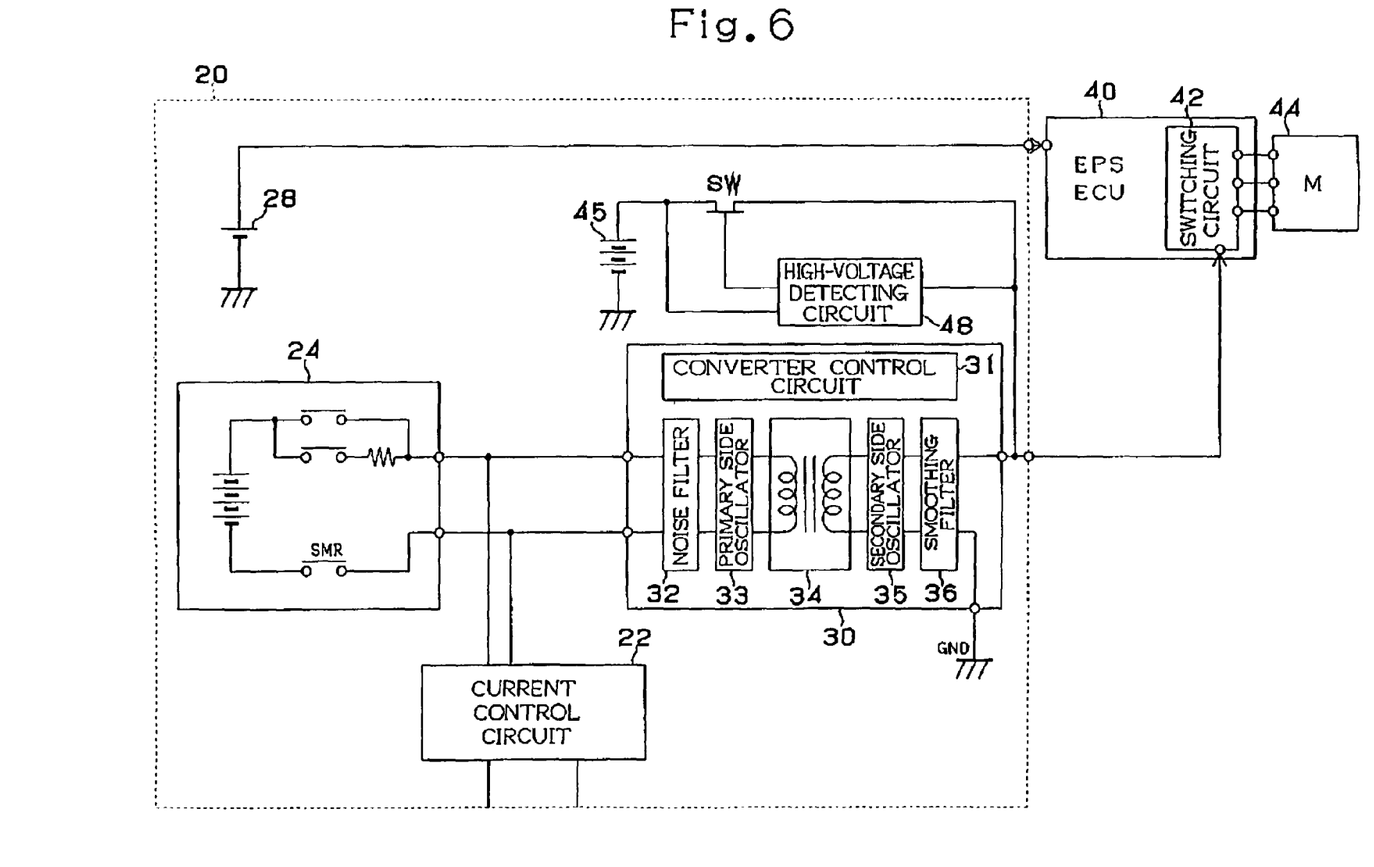
FIG. 6 is a block diagram of a power source showing a first modification of the second embodiment.

FIG. 6 illustrates a power source 20 according to a first modification of the second embodiment. The first modification is similar in the construction of the second embodiment but is arranged in which the high-voltage detector circuit 48 compares the potential of 42 V to be supplied to the switching circuit with the potential at the medium-voltage secondary battery 45 and when judging that the potential at the medium-voltage third battery 45 is higher, the switch SW is turned on to connect the power to the switching circuit 42. In the first modification of the second embodiment, even if a third battery with a large self-discharge is used, the back electromotive force generated at less frequencies is charged in the medium-voltage third battery 45, and supplied to a switching circuit and the like, the fuel consumption of a hybrid vehicle can be reduced.

Figure 7:
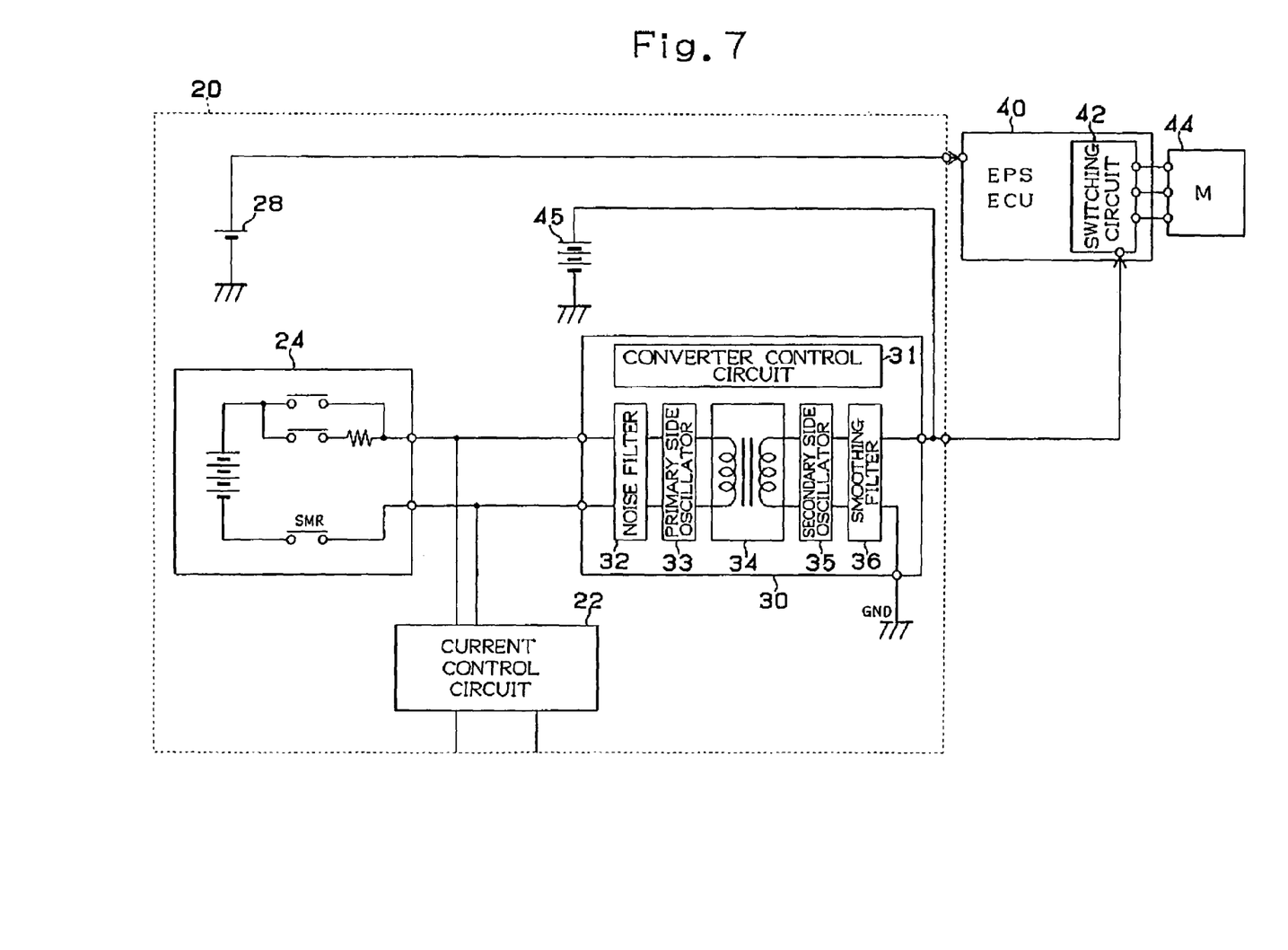
FIG. 7 is a block diagram of a power source showing a second modification of the second embodiment.

FIG. 7 illustrates a power source 20 according to a second modification of the second embodiment. The second modification is similar in the construction to the second embodiment but is arranged in which the medium-voltage third battery 45 is connected directly to the input side of the switching circuit 42. In the second modification of the second embodiment by using a third battery of a small self-discharge, the back electromotive force generated in the motor 44 can be charged in the medium-voltage third battery 45 and supplied to the switch circuit and the like.

INDUSTRIAL APPLICATIONS

Although the foregoing embodiments of the present invention are described in conjunction with a hybrid vehicle using three, high, medium, and low, different voltages, they may be applied to any other vehicle such as an electric vehicle which employs three or more different voltages.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A power source for a hybrid vehicle having an engine and an electric motor generator the power source comprising:
    a first battery configured to output a high magnitude voltage suitable for driving the electric motor generator;
    a circuit configured to output a medium magnitude voltage lower in magnitude than the high magnitude voltage suitable for driving a motor of an auxiliary device;
    a second battery configured to output a low magnitude voltage lower in magnitude than the medium magnitude voltage that is suitable for supplying to a controller;
    a step-down circuit configured to step-down the medium magnitude voltage to the magnitude of the low magnitude voltage and to provide it as an output;
    a back electromotive force detector configured to detect generation of a back electromotive force in the motor of the auxiliary device and to provide a corresponding output; and
    a circuit configured to receive the corresponding output and to respond thereto to charge the second battery with the output from the step-down circuit.

2. A power source for a hybrid vehicle according to claim 1, wherein the auxiliary device is a power steering device.

3. A power source for a hybrid vehicle having an engine and an electric motor generator the power source comprising:
    a first battery configured to output a high magnitude voltage suitable for driving the electric motor generator;
    a second battery configured to output a low magnitude voltage having a magnitude lower than the high magnitude that is suitable for supplying to a controller;
    a third battery configured to output a medium magnitude voltage having a magnitude between the low magnitude and the high magnitude and that is suitable for driving a motor of an auxiliary device;
    a back electromotive force detector configured to detect generation of a back electromotive force in the motor of the auxiliary device and to provide a corresponding output;
    a circuit configured to receive the corresponding output and to respond thereto to charge the third battery from the corresponding output.

4. A power source for a hybrid vehicle according to claim 3, wherein the auxiliary device is a power steering device.

5. A power source for a hybrid vehicle having an engine and an electric motor generator the power source comprising:
    a first battery configured to output a high magnitude voltage suitable for driving the electric motor generator;
    a second battery configured to output a low magnitude voltage having a magnitude lower than the high magnitude that is suitable for supplying to a controller;
    a third battery configured to output a medium magnitude voltage having a magnitude between the low magnitude and the high magnitude and that is suitable for driving a motor of an auxiliary device, the third battery being further connected to receive a back electromotive force temporarily generated in the motor of the auxiliary device.

6. A power source for a hybrid vehicle according to claim 5, wherein the auxiliary device is a power steering device.

* * * * *